United States Patent [19]

Gardella

[11] 4,162,110
[45] Jul. 24, 1979

[54] SEALED THRUST BEARING WITH RESILIENT SEAL HAVING A METAL PORTION

[75] Inventor: Cameron G. Gardella, Woodbury, Conn.

[73] Assignee: The Torrington Company, Torrington, Conn.

[21] Appl. No.: 883,638

[22] Filed: Mar. 6, 1978

[51] Int. Cl.² .............................................. F16C 33/78
[52] U.S. Cl. .................................. 308/234; 308/187.2; 308/235
[58] Field of Search ................. 308/187.1, 187.2, 235, 308/236, 234, 227, 231, 219; 277/95

[56] References Cited

U.S. PATENT DOCUMENTS

| | | | |
|---|---|---|---|
| 3,951,482 | 4/1976 | Blaydon et al. | 308/187.1 |
| 3,981,549 | 9/1976 | Carullo | 308/235 |

Primary Examiner—Douglas C. Butler
Attorney, Agent, or Firm—Frank S. Troidl

[57] ABSTRACT

The inner periphery or the outer periphery, or both, of one thrust race is radially spaced from the corresponding outer periphery or inner periphery, or both, of the other thrust race. A resilient seal is positioned in the radial space thus provided between the corresponding peripheries of the two thrust races. The sealing member includes a metal portion and an annular elastomeric portion adapted to seal the radial space between the peripheries of the thrust races.

5 Claims, 4 Drawing Figures

SEALED THRUST BEARING WITH RESILIENT SEAL HAVING A METAL PORTION

This invention relates to thrust bearing. More particularly this invention is a new thrust bearing of the type which includes a resilient seal to seal the space between the races.

Radial bearings with seals in general have been used effectively. However, in a sealed thrust bearing, particularly thrust bearings which require the use of very small diameter rollers, as in a needle roller thrust bearing assembly, it is much more difficult to include an effective thrust bearing seal between the races. The thrust bearings with small diameter rollers are relatively small in longitudinal distance separating the thrust bearing races, although relatively large in bearing diameter. Because of the small longitudinal space available between the races, thrust bearing seals are also very short in length.

One of the problems with currently used thrust bearings of this type is that the seal lip is so short it cannot accommodate much axial separation of the races and still maintain the sealing function. Another problem is that it is very difficult to prevent the very thin large diameter seals from slipping off the periphery of a race and in that way losing its utility as a seal. In my invention the new thrust bearing includes an arrangement of thrust races and a sealing member with a construction such that even though the thrust bearing is short with a large diameter the resilient seal can accommodate greater axial separation of the races and yet seal the space between the races, and the seal is positively restrained from separation from the races. The seal lip itself may be longer and more flexible. Briefly described my new invention is a thrust bearing comprising a first thrust race and a second thrust race longitudinally spaced from the first thrust race by a plurality of rollers located between the thrust races. Either the inside peripheries or the outside peripheries, or both, of the thrust races are radially spaced from one another. A sealing member is adapted to seal the radial space separating the corresponding peripheries of the two thrust races. The spaces between both pairs of corresponding peripheries may be so sealed. The seal includes an annular resilient elastomeric portion adapted to do the actual sealing of the radial space between the corresponding radial peripheries of the two thrust races. The seal also includes a metal portion. The metal portion is adapted to come into contact with one of the races in a manner to positively maintain the resilient seal in place while adding rigidity to the seal. This eliminates the possibility of the resilient seal becoming disassociated from the races and ceasing its sealing function.

The invention as well as its many advantages will be further understood by reference to the following detailed description and drawings in which.

In the various Figures like parts are referred to by like numbers.

Figure 1:
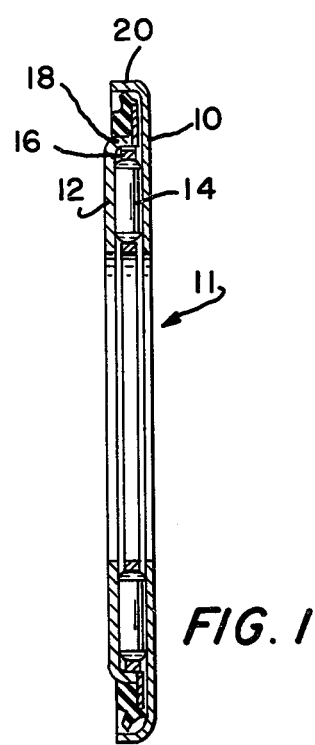
FIG. 1 is a side elevational view, partly in section, showing one preferred embodiment of my invention.

Referring to the drawings and more particularly to FIG. 1, my new sealed thrust bearing indicated generally by 11, includes a first thrust race 10 and a second thrust race 12 axially spaced from the first thrust race. A plurality of rollers 14 are circumferentially spaced apart by being located in pockets of a roller cage 16. In some bearings the cage is omitted. The rollers are of relatively small diameter, thus providing only a small axial space between the thrust race 12 and the thrust race 10. Thrust race 10 may rotate continuously relative to thrust race 12, or it may oscillate relative to race 12 as in the steering knuckle of an automobile. The races may also separate slightly in the longitudinal direction, in service.

The thrust race 12 is provided with an axially extending annular outer periphery flange 18 which is radially spaced inwardly from the axially extending flange 20 located on the outer periphery of thrust race 10.

Figure 2:
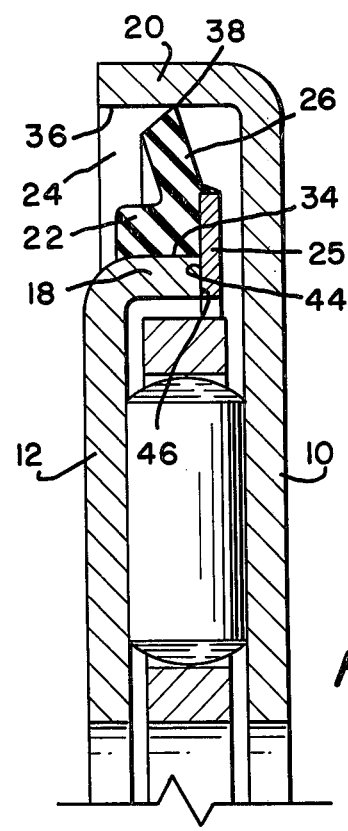
FIG. 2 is a fragmentary view, on an enlarged scale, showing a portion of the thrust bearing shown in FIG. 1.

Referring more specifically to FIG. 2, a seal is located so that an elastomeric portion 22 seals the radial space 24 between the flange 18 on thrust race 12 and the flange 20 on thrust race 10. The seal also includes an annular washer 25 which may be bonded to the elastomeric portion 22 or may be mechanically attached during the molding of the seal. The elastomeric portion 22 includes a sealing lip 26 which extends at an angle with respect to a radial plane perpendicular to the axis of the thrust bearing. The longitudinal wall 34 of the elastomeric portion 22 has a tight fit or sealing press fit against the outside wall of the flange 18 on thrust race 12. A wiping sealing contact of the elastomeric portion 22 is kept with the inside wall 36 of flange 20 by the seal lip 26 at contact area 38.

The metal washer 25 is located in the longitudinal space separating the two thrust races 10 and 12. A portion of the radial surface 44 of the washer 25 is axially adjacent to or in contact with the radial surface 46 of the flange 18. Thus, when the thrust bearing is assembled to a machine assembly, for example, a steering knuckle, the metal annular washer 25 is trapped between the two races 10 and 12. This feature prevents the axially short resilient seal from slipping off the outside of flange 18 and also adds rigidity to the resilient seal. A similar seal may be used to seal the radial space between similarly constructed inner peripheries of the races.

Figure 3:
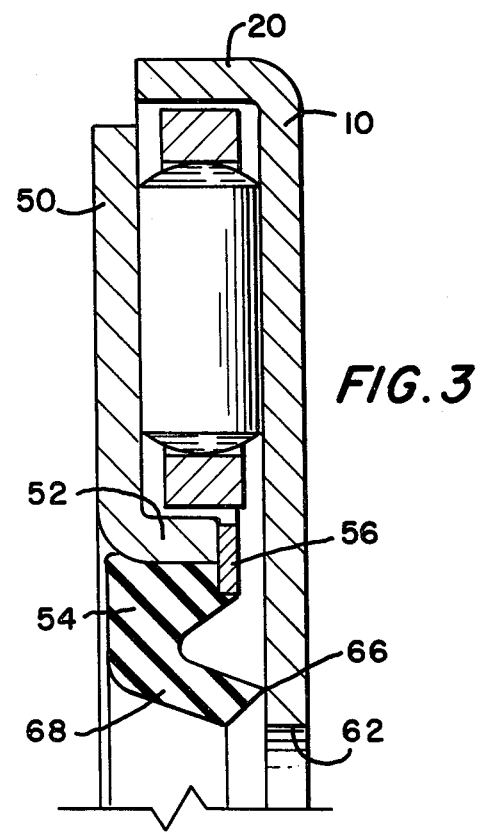
FIG. 3 is a fragmentary view of another preferred embodiment of my invention.

In the embodiment shown in FIG. 3 the race 50 has an inner axially extending flange 52 instead of the outer axially extending flange 18 shown in FIG. 2. The resilient member includes an elastomeric portion 54 and a metal washer 56 which is bonded or otherwise firmly attached to the elastomeric portion 54. Flange 52 is radially spaced from the inner periphery 62 of the thrust race 10. The elastomeric portion 54 is a sealing tight fit against the radially inner wall of flange 52 on thrust race 50. The seal lip 68 of elastomeric portion 54 makes sealing contact with the radially extending race 10 at contact area 66. A similar seal may be used to seal between similarly constructed outer peripheries of the races. The metal washer 56 prevents separation of the seal from the flange 52.

Figure 4:
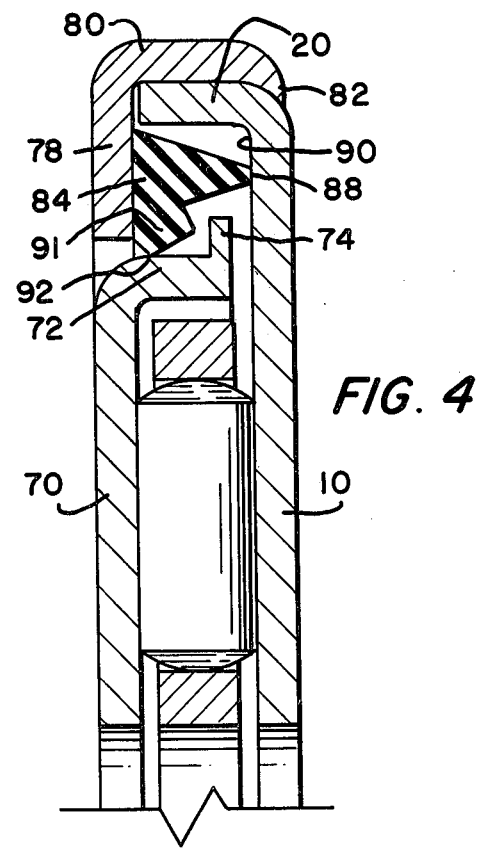
FIG. 4 is a fragmentary view showing still another embodiment of my invention.

In the embodiment shown in FIG. 4 there is included a first race 10 with an outer flange 20 similar to the races shown in FIG. 2 and FIG. 3. The second race 70 includes a flange 72 and a radially extending annular portion 74. The resilient seal includes a metal portion which comprises an annular radial plate 78 and a longitudinal flange 80 which overlaps the flange 20 on thrust race 10. One end of the flange 80 is turned radially inwardly at 82 to encompass a small radial portion of the thrust race 10. The turned in portion 82 prevents longitudinal movement of the seal with respect to the thrust race 10. Inturned portion 82 in FIG. 4 may be a full annular inturned lip or a plurality of isolated inturned areas on the longitudinal flange 80. Annular portion 74 on thrust race 70, since it will contact the elastomeric portion 84 of the resilient member, prevents unwanted longitudinal movement of the race 70 with respect to the resilient seal and thrust race 10. Portion 74 may extend radially outward beyond the inner periphery of radial plate 78.

The elastomeric portion 84 has a radial wall bonded or firmly attached to the inner radial surface of the plate 78. The elastomeric portion 84 also has a contact area 88 in contact with the inner radial surface 90 of thrust race 10 and a sealing lip 91 with a contact area 92 in wiping sealing contact with the outer surface of flange 72. The thrust race 70 rotates or oscillates with respect to thrust race 10. A similar seal may be used to seal the space at the inner peripheries of the two races.

Instead of the axially extending flange 72 and radially extending annular plate 74, I may substitute a truncated conical flange against which the seal lip 91 seals and which is prevented from axial movement from the bearing assembly by interference with the metal seal portion 78.

I claim:

1. A thrust bearing comprising: a first thrust race and a second thrust race longitudinally spaced from the first thrust race, at least one of the two radial peripheries of the first thrust race being radially spaced from the corresponding radial periphery of the second thrust race; a plurality of rollers located between said thrust races; and a resilient seal including an annular elastomeric portion adapted to seal the radial space between said corresponding radial peripheries, and an annular metal portion in contact with one of the races to positively keep the seal in its sealing position between the races.

2. A thrust bearing in accordance with claim 1 wherein: the first thrust race has an annular flange and the annular metal portion of the resilient seal includes a radial plate and an integral longitudinal annular portion which overlaps said annular flange with an interference fit.

3. A thrust bearing in accordance with claim 1 wherein the annular metal portion is an annular metal washer and the elastomeric portion is a lip seal firmly affixed to the washer, said washer being located in the longitudinal space separating the two thrust races and having at least a portion of one radial surface so positioned as to be contacted by one of the thrust races to positively keep the seal in its sealing position between the races.

4. A thrust bearing in accordance with claim 3 wherein the first thrust race has an axial flange, the second thrust race has an axial flange radially spaced inwardly from said first thrust race flange, and at least a portion of a radial surface of the annular metal washer is adjacent to the radial surface of the surface of the second thrust race flange.

5. A thrust bearing in accordance with claim 3 wherein the inner periphery of the first thrust race is radially spaced from the inner periphery of the second thrust race, and at least a portion of a radial surface of the annular washer is adjacent to a radial surface of the first thrust race.

* * * * *